(12) United States Patent
Roy

(10) Patent No.: US 11,442,954 B2
(45) Date of Patent: Sep. 13, 2022

(54) TECHNIQUES FOR ACCESSING ON-PREMISE DATA SOURCES FROM PUBLIC CLOUD FOR DESIGNING DATA PROCESSING PIPELINES

(71) Applicant: Oracle International Corporation, Redwood Shores, CA (US)

(72) Inventor: Debajyoti Roy, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 258 days.

(21) Appl. No.: 16/863,833

(22) Filed: Apr. 30, 2020

(65) Prior Publication Data

US 2021/0342359 A1 Nov. 4, 2021

(51) Int. Cl.
| | | |
|---|---|---|
| *G06F 16/00* | (2019.01) | |
| *G06F 16/25* | (2019.01) | |
| *G06F 7/58* | (2006.01) | |
| *G06F 16/21* | (2019.01) | |
| *G06F 16/23* | (2019.01) | |
| *G06F 9/38* | (2018.01) | |

(52) U.S. Cl.
CPC ............ *G06F 16/254* (2019.01); *G06F 7/582* (2013.01); *G06F 9/3867* (2013.01); *G06F 16/211* (2019.01); *G06F 16/2379* (2019.01)

(58) Field of Classification Search
CPC ...... G06F 16/254; G06F 7/582; G06F 9/3867; G06F 16/211; G06F 16/2379; G06F 9/46
See application file for complete search history.

(56) References Cited

U.S. PATENT DOCUMENTS

| | | | | |
|---|---|---|---|---|
| 2013/0340098 A1* | 12/2013 | Rane | .................. | H04L 63/0407 |
| | | | | 726/29 |
| 2014/0281572 A1* | 9/2014 | Wang | .................. | G06F 21/6254 |
| | | | | 713/189 |
| 2016/0140177 A1* | 5/2016 | Chamberlin | ........ | G06F 16/2455 |
| | | | | 707/717 |

\* cited by examiner

*Primary Examiner* — Tyler J Torgrimson
(74) *Attorney, Agent, or Firm* — Kilpatrick Townsend & Stockton LLP

(57) ABSTRACT

A system for simulating a dataset based on sample statistics, and generating pipeline instructions for a database using the simulated dataset, is disclosed. The system may be a cloud-based platform. The system can provide improved performance and security while designing and deploying Extract-Transform-Load (ETL) database pipelines to manage on-premises data. The system receives, from a remote client, sample statistics characterizing a distribution of data corresponding to a column of a database table. The system can generate, based on the received sample statistics, a simulated dataset representing the column of the database table. The simulated dataset may be generated using pseudo-random data values from a distribution with statistics matching the sample statistics. The system can build a simulated database relation based at least in part on the simulated dataset. The system can generate and deploy pipeline instructions using the simulated database relation.

16 Claims, 15 Drawing Sheets

| ID 205 | REPRESENTATIVE 210 | BALANCE 215 | EXPLANATION 220 |
|---|---|---|---|
| 132930 | ANIL | $240.65 | CUSTOMER RETURN.... |
| 207684 | EVE | $412.22 | NEW SUBSCRIPTION.... |
| 876513 | DAVIS | ($3022.18) | ONE-TIME INVENTORY MARKD.... |
| 876513 | DAVIS | $3124.46 | CORRECTED SALES.... |
| . | . | . | . |
| . | . | . | . |
| . | . | . | . |
| 132930 | ANIL | ($438.32) | COMMISSION FOR.... |
| . | . | . | . |
| . | . | . | . |
| . | . | . | . |
| | | | |
| | | | |
| 537604 | ROSARIO | $2527.20 | NEW MODEL.... |
| . | . | . | . |
| . | . | . | . |
| . | . | . | . |
| | | | |
| | | | |
| 132930 | ANIL | $1442.75 | SEASONAL SALE.... |
| | | | |
| | | | |
| | | | |
| | | | |
| | | | |
| | | | |

FIG. 2A

| ID 260 | REPRESENTATIVE 270 | BALANCE 280 | EXPLANATION 290 |
|---|---|---|---|
| 132930 | ANIL | $240.65 | CUSTOMER RETURN.... |
| 207684 | EVE | $412.22 | NEW SUBSCRIPTION.... |
| 876513 | DAVIS | ($3022.18) | ONE-TIME INVENTORY MARKD.. |
| 876513 | DAVIS | $3124.46 | CORRECTED SALES.... |
| . | . | . | . |
| . | . | . | . |
| . | . | . | . |
| 132930 | ANIL | ($438.32) | COMMISSION FOR.... |
| . | . | . | . |
| . | . | . | . |
| . | . | . | . |
| | | | |
| 537604 | ROSARIO | $2527.20 | NEW MODEL.... |
| . | . | . | . |
| . | . | . | . |
| . | . | . | . |
| | | | |
| | | | |
| 132930 | ANIL | $1442.75 | SEASONAL SALE.... |
| | | | |
| | | | |
| | | | |
| | | | |
| | | | |
| | | | |

MEAN = 413872
STD DEV = 347055

MEDIAN LENGTH = 22.6
MODE LETTER = 'T'
MEAN WORD LENGTH = 4.2

FIG. 2B

| ID 310 | REPRESENTATIVE 320 | BALANCE 330 | EXPLANATION 340 |
|---|---|---|---|
| 296814 | CEI | $2748.03 | RQTO VSHG ZQZG.... |
| 128364 | WWS | $2822.41 | OIFA QAGF DZKLA.... |
| 769420 | RVS | $2388.21 | TDEO W TJR DYHBU.... |
| 96491 | BMBA | $1551.00 | NFWNM CGDXLB CQLJC.... |
| -47376 | KIX | ($972.28) | KZPSQ KSJM CGDXLB.... |
| 387421 | FKJDHU | ($1093.1) | SSA CSV QWOL WXE.... |
| 1016605 | UWVG | $2791.67 | TORVFO P CVGZ.... |
| 22986 | KBZD | $5810.41 | WDWZAZ AKGXGR BACSI.... |
| 669333 | YTDLJ | ($1318.86) | YCN GCF EQLXWL.... |
| 508820 | ZVPUOTO | ($4911.38) | CWMGP DCPGI AWT.... |
| 988860 | JJ | ($272.89) | . |
| 971134 | IJCZ | $3356.35 | . |
| 197343 | EMA | . | . |
| 669243 | VA | . | |
| 389927 | ZOFQ | . | |
| 410902 | YTUN | | |
| . | . | | |
| . | . | | |
| . | . | | |

MEAN = 413872
STD DEV = 347055

FIG. 3

TECHNIQUES FOR ACCESSING ON-PREMISE DATA SOURCES FROM PUBLIC CLOUD FOR DESIGNING DATA PROCESSING PIPELINES

BACKGROUND OF THE INVENTION

Cloud-based platforms have become increasingly common for end-to-end data management in database systems, such as Extract-Transform-Load (ETL) database systems. Such cloud-based platforms may offer entire suites of cloud solutions around a customer's data, for example solutions for authoring transformations, loading data, and presenting the data. However, the data may be very valuable, and accordingly often will not actually reside on the cloud platform, but rather onsite, at the customer organization that owns the data. Accordingly, data sources physically located at a customer's on-premises data center may need to be accessed from a system residing in the public cloud in order to manage the on-premises data, and to author pipelines, such as ETL pipelines, that manage the data.

In particular, it is desirable to have an expeditious way to design, develop, and test data processing pipelines. However, accessing data sources behind a customer's network firewall and physically located at a remote data center can cause network I/O bottleneck. Also, the data elements can require special handling at rest and transit due to stringent security and compliance requirements. Transferring the data to the cloud platform may create many challenges, such as managing and securing the data, make sure it is not lost in transit, etc.

To circumvent the performance bottlenecks of accessing remote data sources, conventional approaches may typically focus on design systems in the public cloud that downsample and cache data from on-premises data sources. However, such approaches may not fully address the performance bottleneck, since there is still data transfer involved. Specifically, which such data transfer may have a space complexity of $O(n \times p)$, where n is the number of samples and p is the number of columns.

Additionally, there could be copies of highly sensitive data sets, such as personally identifiable information (PII) or personal health information (PHI), residing within the design system in the public cloud. Thus, such approaches may also pose serious security and compliance threats to such sensitive data sets. Masking, salting, encrypting, etc. of sensitive data in the public cloud leads to additional access control and loss of referential integrity related challenges.

BRIEF SUMMARY OF THE INVENTION

Techniques are provided (e.g., a method, a system, non-transitory computer-readable medium storing code or instructions executable by one or more processors) for simulating a dataset based on sample statistics, and generating pipeline instructions for a database using the simulated dataset.

In an embodiment, a server receives, from a remote client, sample statistics describing data, the data corresponding to an attribute of a database relation. A simulated dataset is generated, on the server and based at least in part on the received sample statistics, the simulated dataset corresponding to the attribute of the database relation. A simulated database relation is built based at least in part on the simulated dataset.

In a variation on this embodiment, the sample statistics characterize a distribution of the data corresponding to the attribute.

In a variation on this embodiment, pipeline instructions associated with a database pipeline are generated, based at least in part on the simulated dataset. The server deploys the generated pipeline instructions to the remote client In a variation on this embodiment, the remote client is configured to receive the pipeline instructions. The remote client is further configured to execute the pipeline instructions using the data corresponding to the attribute of the database relation.

In a variation on this embodiment, generating the simulated dataset further comprises generating pseudo-random data values according to a distribution, the distribution having population statistics matching the received sample statistics.

In a variation on this embodiment, the server obtains a seed value. Generating the pseudo-random data values may further be based at least in part on the obtained seed value.

In a variation on this embodiment, generating the pseudo-random data values further comprises seeding a pseudo-random generator with at least the obtained seed value.

In a variation on this embodiment, the remote client is configured to determine the sample statistics describing the data.

In a variation on this embodiment, the server receives, from the remote client, updated sample statistics describing updated data, the updated data corresponding to the attribute of the database relation. The simulated dataset is updated, on the server and based at least in part on the updated sample statistics.

In a variation on this embodiment, the attribute comprises a column of an on-premises database table, and wherein the data corresponding to the attribute is stored within the column.

In a variation on this embodiment, the received sample statistics describing the data comprise information other than the data, and wherein a size of the received sample statistics does not depend on a size of the data.

In a variation on this embodiment, the received sample statistics comprise one or more of: a sample minimum value; a sample maximum value; a sample mean value; a sample median value; a sample mode value; a sample standard deviation; a sample statistical moment; a sample length; a sample range; a sample statistical frequency; a sample count; or a sample distinct count.

Some, any, or all of the above features may be implemented as a method, system, or computer-readable storage medium. The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 2A illustrates an example database table.

FIG. 2B illustrates column statistics characterizing data in the example database table of FIG. 2A, according to an embodiment.

FIG. 3 illustrates an example simulated dataset based on the column statistics in the example of FIG. 2B, according to an embodiment.

DETAILED DESCRIPTION OF THE INVENTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Cloud-based platforms have become increasingly common for end-to-end data management in database systems, such as Extract-Transform-Load (ETL) database systems. Such cloud-based platforms may offer entire suites of cloud solutions around a customer's data, for example solutions for authoring transformations, loading data, and presenting the data. However, the data may be very valuable, and accordingly will often not actually reside on the cloud platform, but rather will reside onsite at the customer organization that owns the data. Accordingly, data sources residing in a customer's on-premises data center, referred to herein as a data plane, may need to be accessed from a system located in the public cloud in order to author pipelines, such as ETL pipelines, that manage the on-premises data. In particular, it is desirable to have an expeditious way to design, develop, and test data processing pipelines.

Figure 1:
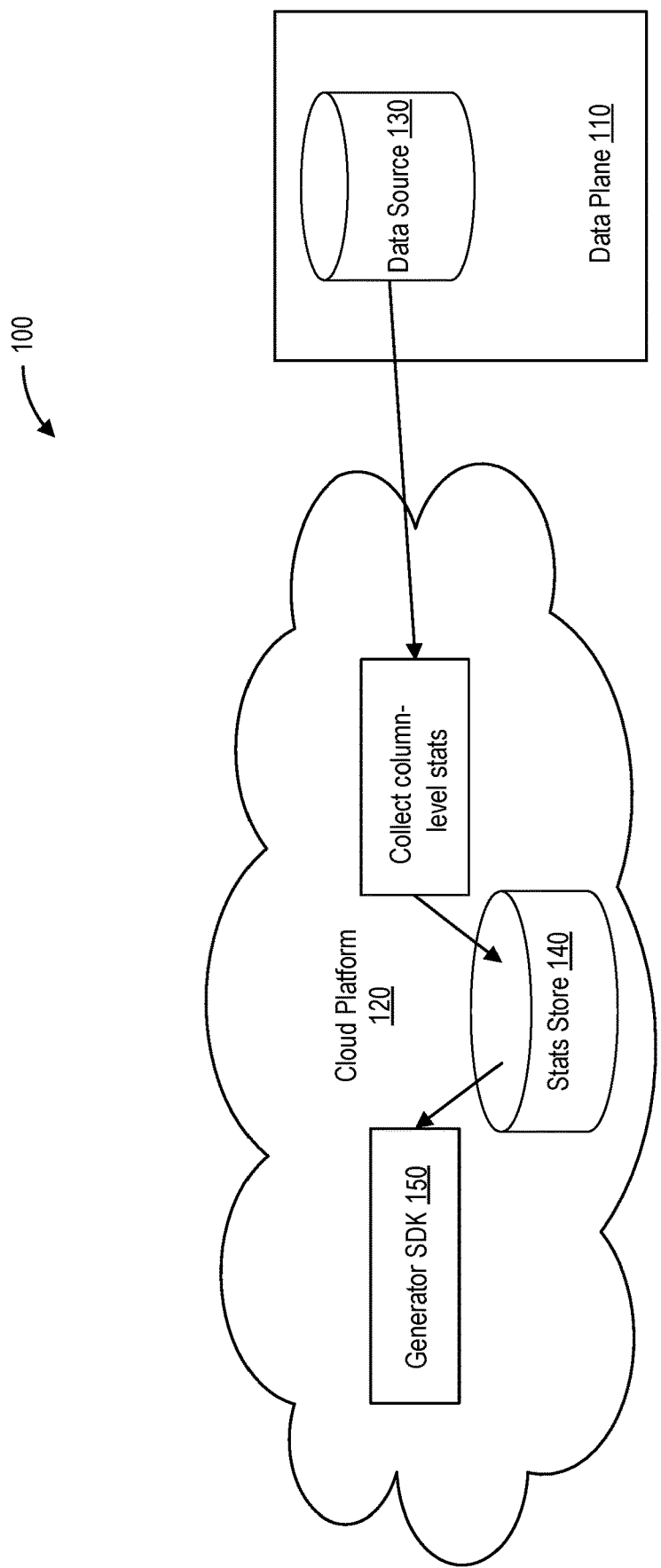
FIG. 1 illustrates data flow during data pipeline design and generation, according to an embodiment.

FIG. 1 illustrates data flow 100 during data pipeline design and generation, according to an embodiment. Data flow 100 may take place between data plane 110 and cloud platform 120. Data plane 110 may include any on-premises computing or storage system, such as on-premises data source 130. Cloud platform 120 may also be referred to herein as a control plane.

In an embodiment, data plane 110 and/or data source 130 may transfer descriptive information, such as descriptive statistics, to cloud platform 120. For example, the descriptive statistics may include any statistics, such as sample statistics, that characterize and/or describe a database table of data source 130 at a column level, as described herein below. Cloud platform 120 may collect the descriptive information and/or statistics and store it in a statistics store 140. Cloud platform 120 may then use the collected descriptive information and/or statistics to generate simulated data, and may design data processing pipelines based on the simulated data.

In particular, in some embodiments, cloud platform 120 may include a generator software development kit (SDK) 150, which can be used to design, develop, and test data processing pipelines that manage the data in data source 130, and/or instructions for implementing such pipelines. In performing these functions, it may be advantageous for generator SDK 150 to access the data of data source 130. However, in conventional approaches, transmitting all the data needed from data source 130 to cloud platform 120 can produce network I/O bottleneck. Moreover, data source 130 may be situated at a remote physical data center such as data plane 110, and may be behind a network firewall. Client organizations may also be hesitant to share valuable, potentially private data from data source 130 with an external cloud service provider such as cloud platform 120. By the same token, due to stringent security and compliance requirements, the data may require special handling at rest as well as in transit.

To resolve these problems, in embodiments of the disclosed system and methods, generator SDK 150 can query statistics store 140 for subsets and/or summaries of the column-level descriptive statistics, and may load the queried statistics and/or summaries from statistics store 140. At the time of designing the data pipelines, the system can use the statistics and/or summaries to generate a simulated dataset representing the corresponding column of the data in data source 130, as described herein below. In this way, generator SDK 150 can be used to design, develop, and test instructions for implementing data processing pipelines based on the simulated dataset. After the data processing pipelines are designed and/or associated instructions are generated, the instructions can be deployed to data plane 110 for use by data source 130, as described herein below.

Thus, the disclosed system and methods can enable the design, development, and testing of data processing pipelines, without needing to communicate the authentic data from data plane 110 to cloud platform 120. Unlike conventional approaches, the disclosed system and methods may sidestep and virtually eliminate concerns, such as performance limitations and security concerns, associated with transmitting authentic data. In particular, in the disclosed embodiments, the space complexity of data transfer may be O(p), where p is the number of columns, because the descriptive statistics can characterize the distribution of an entire respective column, without scaling with the size of the column.

FIG. 2A illustrates an example database table 200. In a typical example, the database table 200 may be a local, on-premises database table, such as data source 102 in data plane 104 of the example of FIG. 1 above. For example, database table 200 may be stored in a local computing environment of an organization, such as an enterprise.

Database table 200 may be stored in any on-premises computing or storage system, such as client computers 1104-1108 in the example of FIG. 11 below, an intranet or local network, or a computing system such as computing system 1200 in the example of FIG. 12 below, and is not limited by the present disclosure.

In this example, database table 200 has multiple columns, such as columns 205-220, and multiple rows, such as rows 225 and 230, each containing an individual database record. Note that columns may also be referred to herein as attributes, and tables may also be referred to herein as relations.

The column 205, labeled "ID," may provide a unique identifier, such as an employee number. In this example, all the rows having the same value for column 210, labeled "representative," also have the same ID value in column 205. For instance, both rows 225 and 230 have the value "Anil" for column 210, and have the same ID value "132930" in column 205. Accordingly, column 205 may be used as a unique key in database operations, such as join.

FIG. 2B illustrates column statistics characterizing data in the example database table of FIG. 2A, according to an embodiment. In a typical example, the database table 250 may be a local, on-premises database table, as in the example of FIG. 2A. Likewise, database table 250 may have multiple columns 260-290, and multiple rows, as in the example of FIG. 2A.

In an embodiment, the on-premises system can compute descriptive statistics, such as sample statistics, based on the data in each column of table 250. For example, the mean of the ID values in column 260 is "413872," and the standard deviation of the ID values in column 260 is "347055." Likewise, column 290 stores strings, and the strings have a median total length of "22.6" characters, a mode (or most common) character "T," and a mean word length of 4.2 characters.

Note that different choices of descriptive statistics are possible. In this example, the descriptive statistics computed for column 260 differ from those computed for column 290. In various embodiments, the computed descriptive statistics comprise one or more of: a sample minimum value; a sample maximum value; a sample mean value; a sample median value; a sample mode value; a sample standard deviation; a sample statistical moment; a sample length; a sample range; a sample statistical frequency; a sample count; or a sample distinct count. In various embodiments, any descriptive statistics may be computed, and are not limited by the present disclosure.

The descriptive statistics computed may characterize the data within the column. In this regard, the descriptive statistics may be computed based on all the data available, for example all the data present in the column of table 250. Accordingly, the statistics may be regarded as sample statistics, for example a mean may be computed by summing the data values in the column and dividing by the number of data values, rather than based on a statistical estimate of an underlying population mean. However, in some embodiments, the descriptive statistics may instead include population statistics, or any combination of population statistics and sample statistics, and are not limited by the present disclosure. In an embodiment, the descriptive statistics computed may be chosen based at least partly on a data type of the column, such as numeric, string, currency, etc.

Moreover, these descriptive statistics are not necessarily chosen based on the contents or the distribution of the data in the column. For example, it is known that statistical moments of a sample or a dataset, such as a mean, variance, skewness, kurtosis, and/or higher-order moments of the sample or dataset, can characterize the sample or dataset. Moreover, it is known that using more statistical moments may generally characterize the sample or dataset more accurately and/or precisely. Accordingly, in some embodiments, the sample statistics may be chosen without regard to the contents and/or distribution of the data, for example, a mean, variance, skewness, kurtosis, and/or higher-order moments may be computed, regardless of the actual distribution of the data, and may nevertheless characterize the distribution of the data. In some examples, other descriptive statistics may be computed (e.g., median, mode, range, etc.), and such other descriptive statistics also may characterize the distribution of the data. In alternative embodiments, the sample statistics may instead be chosen based on a more detailed knowledge of the contents and/or distribution of the data.

For example, the representative IDs in column 260 may have been assigned to representatives in arbitrary order or by arbitrary methods, and may not admit a straightforward interpretation as cardinal or ordinal numbers. Accordingly, the representative IDs in column 260 may not be distributed according to a normal distribution or other common statistical distribution. Nevertheless, in this example, the descriptive statistics computed to describe column 260 can still include statistics typically associated with a normal or other common distribution, such as a mean and standard deviation, as long as these statistics still usefully characterize the data of column 260. In particular, the descriptive statistics may be chosen so as to provide useful simulated data for the purpose of designing, developing, and/or testing data processing pipelines.

Note that the. Once these descriptive statistics are generated, the on-premises system may send the descriptive statistics to a cloud platform, which may use the descriptive statistics to simulate a dataset, as described herein below.

The creation of a method that queries statistical summary, specific to each column and its data type from a on premise customer data source, subsequently leveraging that information to generate in-memory data randomly and deterministically with the help of a seed, within the public cloud based design system. As an example, for a numerical column min, max, mean, standard deviation, count and distinct count will be captured to generate in-memory data using a fixed seed for the column name within the design system for development and testing of data pipelines. Appropriate statistics are to be derived for specific columnar data types, for text columns, the summary of possible characters and length related statistical summaries will be apt. Similarly, for nested column data types where the summary of leaf level data types will be derived.

FIG. 3 illustrates an example simulated dataset based on the column statistics in the example of FIG. 2B, according to an embodiment. In a typical example, the database table 300 may belong to a cloud-based platform, such as cloud platform 106 of the example of FIG. 1. Database table 300 may be stored in a cloud-based server, data center, or storage device, or in any cloud-based computing or storage system, such as cloud infrastructure system 1102 of the example of FIG. 11 below, a wide area network or the Internet, or a cloud-based server or computing system such as BI Apps cloud 1302 in the example of FIG. 13 below, and is not limited by the present disclosure.

In some embodiments, database table 300 may correspond to database tables 200 of the example of FIG. 2A and 250 of the example of FIG. 2B. In particular, the cloud-based platform may include a platform for designing, developing, generating, and/or testing data processing pipelines that are used to process database table 200 of the example of FIG. 2A and table 250 of the example of FIG. 2B. Once the data processing pipelines are generated, instructions associated with the data processing pipelines may be deployed and/or transmitted to the data source, data plane, and/or local computing system in the example of FIG. 2B via the Internet, a virtual private network (VPN), a secure transmission, or any other means of communication, and are not limited by the present disclosure. Accordingly, database table 300 may have the same design, including the same attributes with the same data types, as database tables 200 and 250.

In an embodiment, the cloud-based platform may receive the descriptive statistics computed from table 250 of the example of FIG. 2B. For example, the cloud-based platform may receive the descriptive statistics sent by the data source, data plane, and/or local computing system in the example of FIG. 2B via the Internet, a virtual private network (VPN), a secure transmission, or any other means of communication, and is not limited by the present disclosure. In addition, the cloud-based platform may simulate new datasets based on the received descriptive statistics. In this example, column 310, labeled "ID," may contain a simulated dataset based on the mean and standard deviation of column 260 in the example of FIG. 2B. In particular, column 310 may contain data values generated by pseudo-random number generator. The pseudo-random number generator may generate pseudo-random numbers according to a statistical distribution, including but not limited to standard statistical distributions such as a normal distribution, a uniform distribution, a Cauchy distribution, a Poisson distribution, a logistic distribution, a binomial distribution, or any other distribution. The pseudo-random number generator may also use any other distribution, and is not limited by the present disclosure. The term "random" may also be used herein to refer to data generated using a pseudo-random number generator.

When generating the simulated dataset, the pseudo-random number generator may use the received descriptive statistics values as parameters of the distribution. In this example, the pseudo-random number generator may use "413872" as a mean parameter for the distribution, which is the received value corresponding to the mean of the corresponding column 260 in the example of FIG. 2B. Likewise, the pseudo-random number generator may use "347055" as a distribution standard deviation parameter, which is the received value corresponding to the standard deviation of corresponding column 260 in the example of FIG. 2B. Accordingly, the system can use normally distributed pseudo-random numbers having a population mean "413872" and population standard deviation "347055."

In various embodiments, the system may use other probability distributions, and/or other parameters, to generate the simulated data. For example, the system may use a minimum value, a maximum value, a mean, a median, a mode, a standard deviation, a statistical moment, a length, a range, a statistical frequency, a count, or a distinct count, or any other parameters with a probability distribution when generating the simulated data, and is not limited by the present disclosure. In another example, note that the text data contained in column 290 in FIG. 2B has a mode, or most common, letter of "T," a median string length of 22.6 characters, and a mean word length of 4.2 characters. Accordingly, the system may also generate a simulated dataset in the corresponding column 340 of table 300, based on a probability distribution for random strings with a mode letter parameter of "T," median string length parameter of 22.6 characters, and a mean word length parameter of 4.2 characters.

Moreover, note that in the latter example, the system can generate a simulated dataset with random strings in column 340. In some embodiments, the system may generate simulated data of any data type, including but not limited to integer, numeric, floating point, fixed-precision numeric, complex numbers, strings, currency, etc. In some embodiments, a data type of the simulated data may match the data type of the actual data in the corresponding column in the local table. In this example, column 310 has an integer data type, as does corresponding column 260 of the example of FIG. 2B, and therefore does not include fractional or decimal data values.

As discussed above, the descriptive statistics and/or parameters are not necessarily chosen based on the distribution of the actual column data of table 250 in the example of FIG. 2B, yet still may usefully characterize the distribution. For example, the cloud-based platform may use a particular probability distribution to generate the simulated dataset, and may therefore use parameters typically associated with that particular probability distribution, irrespective of the actual distribution of the actual column data of table 250. In this example, the simulated data of column 310 has been generated using a normal distribution, and accordingly the parameters used to generate the simulated dataset are the mean, "413872," and standard deviation, "347055," even though the original data in the corresponding column 260 in the example of FIG. 2B might not be normally distributed.

Accordingly, the generated simulated dataset in table 300 may not necessarily follow an identical distribution to the actual data in table 250 of the example of FIG. 2B, yet still may be useful for the purpose of designing, developing, and/or testing data processing pipelines. In this example, simulated data element 350 in column 310 has value "−47376," i.e. a negative value, even though the corresponding column 260 of the example of FIG. 2B has only positive data values. However, this value is a typical random value generated by a normal distribution having the same mean and standard deviation as the actual data in column 260 of FIG. 2B. In particular, the mean "413872" is only about 1.19 standard deviations ("347055") from zero in this example, so it is to be expected that approximately $$\frac{1}{2}\mathrm{erfc}\left(\frac{1.19}{\sqrt{2}}\right) \approx 11.7\%$$

of the simulated data values may be negative.

Such simulated data, having the same mean and standard deviation as the actual data in column 260 of FIG. 2B, may still be useful for the purpose of designing, developing, and/or testing data processing pipelines. In some examples, additional statistics may be chosen to constrain the simulated data to be more similar to the actual data. For example, if a range statistic were specified, the simulated data might be constrained to fall within the specified range, as well. In this way, the simulated data could be constrained to be positive, or to have a minimum value greater than zero or some other value, etc. Moreover, in some embodiments, a particular statistical distribution may also be specified, and the simulated data may be generated according to the specified distribution, and is not limited by the present disclosure.

The remaining columns of table 300 may also have simulated data. In this example, column 320, labeled "representative," contains simulated words, which may be generated so as to be similar to the contents of column 270 in the example of FIG. 2B. In particular, the simulated data in column 320 may be generated according to a probability distribution having parameters that match descriptive statistics of column 270, which are received from the data source, data plane, and/or local computing system in the example of FIG. 2B. Accordingly, the lengths, common letters, and/or other characteristics of the words in column 320 may be similar to the names in corresponding column 270. Likewise, in this example, column 330, labeled "balance," has currency values that are distributed similarly to the contents of corresponding column 280 in FIG. 2B. And column 340, labeled "explanation," has random strings with multiple random words. The random strings are likewise distributed similarly to corresponding column 290 in FIG. 2B. For example, as described above, the random strings can be generated from a statistical distribution having a mode letter parameter of "T," median string length parameter of 22.6 characters, and a mean word length parameter of 4.2 characters.

In particular, note that non-numeric values, such as the string values of columns 320 and 340, may also be generated using a pseudo-random number generator. For example, pseudo-random strings may be generated for columns 320 and 340 on the basis of pseudo-random numbers. In various embodiments, the length and/or composition of the strings in column 320 may be determined based on pseudo-random numbers using various techniques, and are not limited by the present disclosure. Likewise, the number, length, and composition of words within the strings in column 340 may be determined based on pseudo-random numbers. In a first example, individual characters within the words and/or strings may be chosen based on pseudo-random numbers and/or a statistical distribution. For example, one way to generate strings having a mode letter of "T" is by generating the individual letters according to a distribution with a mode parameter corresponding to the character "T." In another example, the words themselves may be chosen, e.g. from a dictionary, based on pseudo-random numbers and/or a statistical distribution. In such an example, the strings might still be generated with a mode letter of "T," for example by frequently choosing words that contain one or more instances of the character "T," so as to result in an overall mode letter of "T." In some instances, the use of the pseudo-random number generator (e.g., a form of repeatability) is leveraged to ultimately solve the problem of referential integrity noted above.

As described above, the simulated data may be generated using a pseudo-random number generator, according to a statistical distribution, and with the received descriptive statistics values as parameters of the distribution. Note also that the pseudo-random number generator may be seeded with a seed value. In some embodiments, using a definite seed value for the pseudo-random number generator may result in a deterministic, repeatable sequence of pseudo-random values for the simulated data. It is known that pseudo-random number generators generally use deterministic sequences or algorithms to determine pseudo-random numbers, and therefore an entire sequence of pseudo-random numbers may be determined by the seed value used. Accordingly, in some embodiments, the system may be able to reproduce the simulated dataset deterministically in multiple locations and/or on multiple occasions, without needing to store or transmit the detailed simulated dataset.

Figure 4:
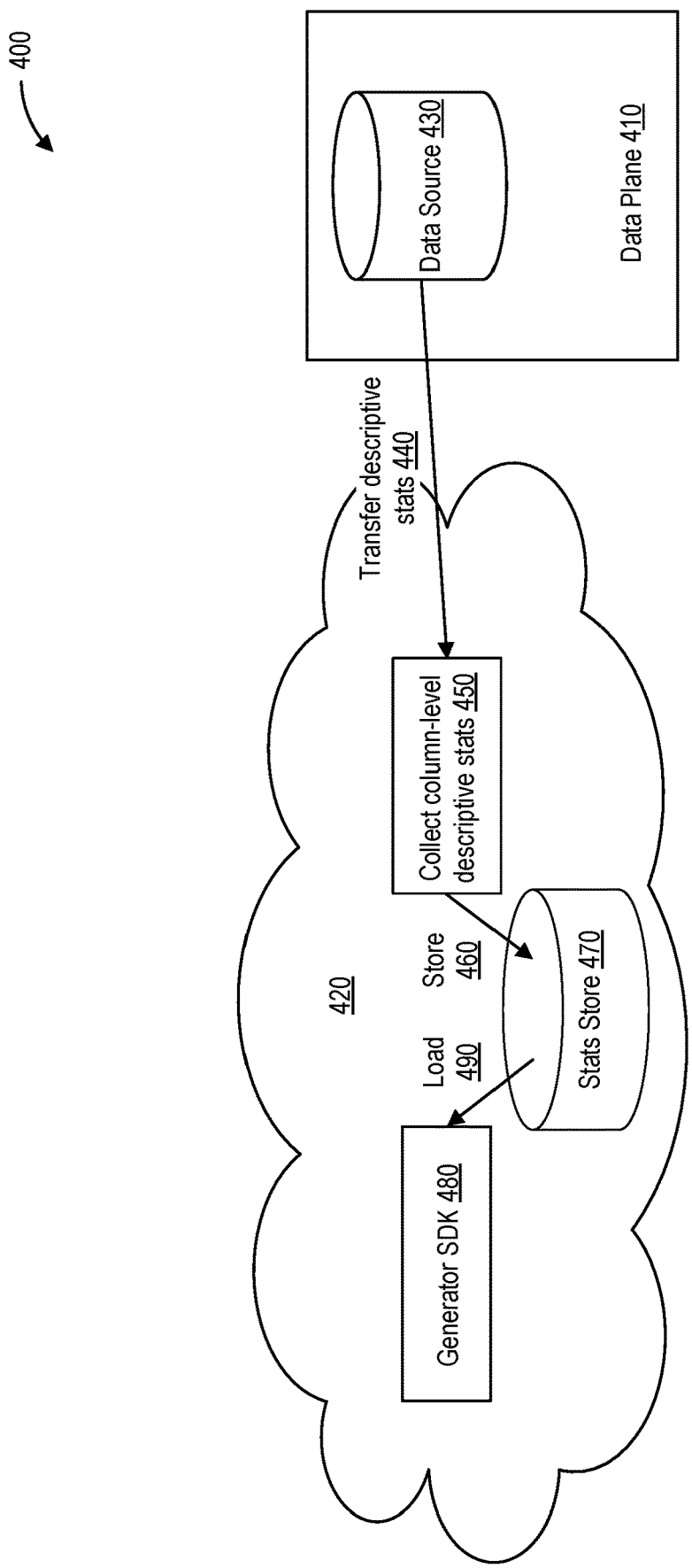
FIG. 4 illustrates data flow during data pipeline design and generation, according to an embodiment.

FIG. 4 illustrates data flow 400 during data pipeline design and generation, according to an embodiment. Data flow 400 may take place between data plane 410 and cloud platform 420. Data flow 400 may include the transfer of summary statistics, such as in the examples of FIGS. 2B and 3 above, from data plane 410 to cloud platform 420, and the subsequent transfer of instructions associated with data processing pipelines from cloud platform 420 to data plane 410.

Data plane 410 may include any on-premises computing or storage system, such as a local computing environment, intranet, or local network of an enterprise or other organization. In this example, data plane 410 can include an on-premises data source 430, such as client computers 1104-1108 in the example of FIG. 11 below, or a computing system such as computing system 1200 in the example of FIG. 12 below, and is not limited by the present disclosure. In some embodiments, data plane 410 might not be on-premises, but still might not be accessible by cloud platform 420 or generator SDK 480. For example, data plane 410 might itself be Internet- or cloud-based, but be geographically or physically separated, or separated by security settings, from cloud platform 420, and is not limited by the present disclosure.

Cloud platform 420 may include a cloud-based platform, a cloud-based server, a data center, a storage device, or any cloud-based computing or storage system, such as cloud infrastructure system 1102 of the example of FIG. 11 below, a wide area network or the Internet, or a cloud-based server or computing system such as BI Apps cloud 1302 in the example of FIG. 13 below, and is not limited by the present disclosure. Cloud platform 420 may also be referred to herein as a control plane.

In an embodiment, data plane 410 and/or data source 430 may transfer 440 descriptive statistics to cloud platform 420. The descriptive statistics can include any statistics, such as sample statistics, that characterize and/or describe a database table of data source 430 at a column level, as described in the examples of FIGS. 2A, 2B, and 3 above. In various embodiments, the descriptive statistics may include one or more of: a column minimum value; a column maximum value; a column mean value; a column median value; a column mode value; a column standard deviation; a column statistical moment; a column length; a column range; a column statistical frequency; a column count; or a column distinct count. In various embodiments, any other descriptive statistics may also be transferred 440, and are not limited by the present disclosure.

Cloud platform 420 may collect 450 the column-level descriptive statistics. Cloud platform 420 may store 460 the column-level descriptive statistics in a statistics store 470. Statistics store 470 may include a cloud-based storage system, data center, or storage device, or any cloud-based computing or storage system, such as cloud infrastructure system 1102 of the example of FIG. 11 below, and is not limited by the present disclosure.

In embodiments, cloud platform 420 may include a generator software development kit (SDK) 480, which can be used to design, develop, and test data processing pipelines that manage the data in data source 430, and/or instructions for implementing such pipelines. For example, the data pipelines may include Extract-Transform-Load (ETL) pipelines, Extract-Load-Transform (ELT) pipelines, or other data processing pipelines, and are not limited by the present disclosure. In particular, generator SDK 480 may be used to generate instructions specifically for a client's database, such as data source 430 in this example. In performing these functions, it may be advantageous for generator SDK 480 to have access to the data of data source 430. However, in conventional approaches, transmitting all the column-level data needed from data source 430 to cloud platform 420 can produce network I/O bottleneck. Moreover, data source 430 may be situated at a remote physical data center such as data plane 410, and may be behind a network firewall. Client organizations may also be hesitant to share valuable, potentially private data from data source 430 with an external cloud service provider such as cloud platform 420. Sharing such data may create challenges for the client organizations, including managing and securing the data, ensuring the data is transmitted without loss or errors, etc. By the same token, due to stringent security and compliance requirements, the data may require special handling at rest as well as in transit.

To resolve these problems, in embodiments of the disclosed system and methods, generator SDK 480 can implement a service that can query statistics store 470 for elements, subsets, and/or summaries of the column-level descriptive statistics. Accordingly, generator SDK 480 may load 490 the queried statistics and/or summaries from statistics store 470. At the time of designing the data pipelines, a pseudo-random generator associated with generator SDK 480 can use the statistics and/or summaries to generate a simulated dataset representing the corresponding column of the data in data source 430, as described in the example of FIG. 3 above. In this way, generator SDK 480 can be used to design, develop, and test instructions for implementing data processing pipelines based on the simulated dataset. In some examples, a user or developer from the client organization may request a graphical user interface to show the simulated data set using an SDK in order to design, develop, and test the logical data pipeline in the cloud platform, i.e. the control plane. After the data processing pipelines are designed and/or associated instructions are generated, the instructions can be deployed to data plane 410 for use by data source 430, as described in the example of FIG. 5 below.

In particular, the pseudo-random generator may use the statistics and/or summaries together with a pre-determined seed value to generate the simulated dataset deterministically, such that the system may be able to reproduce an identical simulated dataset on demand. It is known that pseudo-random number generators generally use deterministic sequences or algorithms to determine pseudo-random numbers, and therefore an entire sequence of pseudo-random numbers may be determined by the seed value used. Accordingly, the cloud-based platform 420 may be able to reproduce the same simulated dataset in multiple locations and/or on multiple occasions based on a known seed value, without needing to store or transmit the detailed simulated dataset.

Thus, the disclosed system and methods can enable the design, development, and testing of data processing pipelines, without needing to communicate the authentic data from data plane 410 to cloud platform 420. Unlike conventional approaches, the disclosed system and methods may sidestep and virtually eliminate concerns, such as performance limitations and security concerns, associated with transmitting authentic data. In particular, in the disclosed embodiments, the space complexity of data transfer may be O(p), where p is the number of columns, because the descriptive statistics can characterize the distribution of an entire respective column, without scaling with the size of the column. By contrast, conventional approaches do require data transfer between data plane 410 and cloud platform 420, and thus may face a performance bottleneck. Such data transfer in conventional approaches may have a space complexity of O(n×p), where n is the number of transmitted data samples per column, and p is the number of columns. In some examples, Big O notation (e.g., "O(n×p)"), also known as algorithmic efficiency, is one way to describe how the time it takes to run a function grows as the size of the input (to the function) grows. In other words, Big O notation provides a way to identify how time scales with respect to some input variables. Additionally, the disclosed method can virtually eliminate the chance of incorrect design time assumptions due to down-sampling of rows that can skew a designer or programmer.

Gathering the statistics from on-premise data sources and generating the in-memory representative data in the public cloud is more compute intensive which, scales lot better than network IO. Some databases already compute column level statistics that will give this method an additional advantage.

Figure 5:
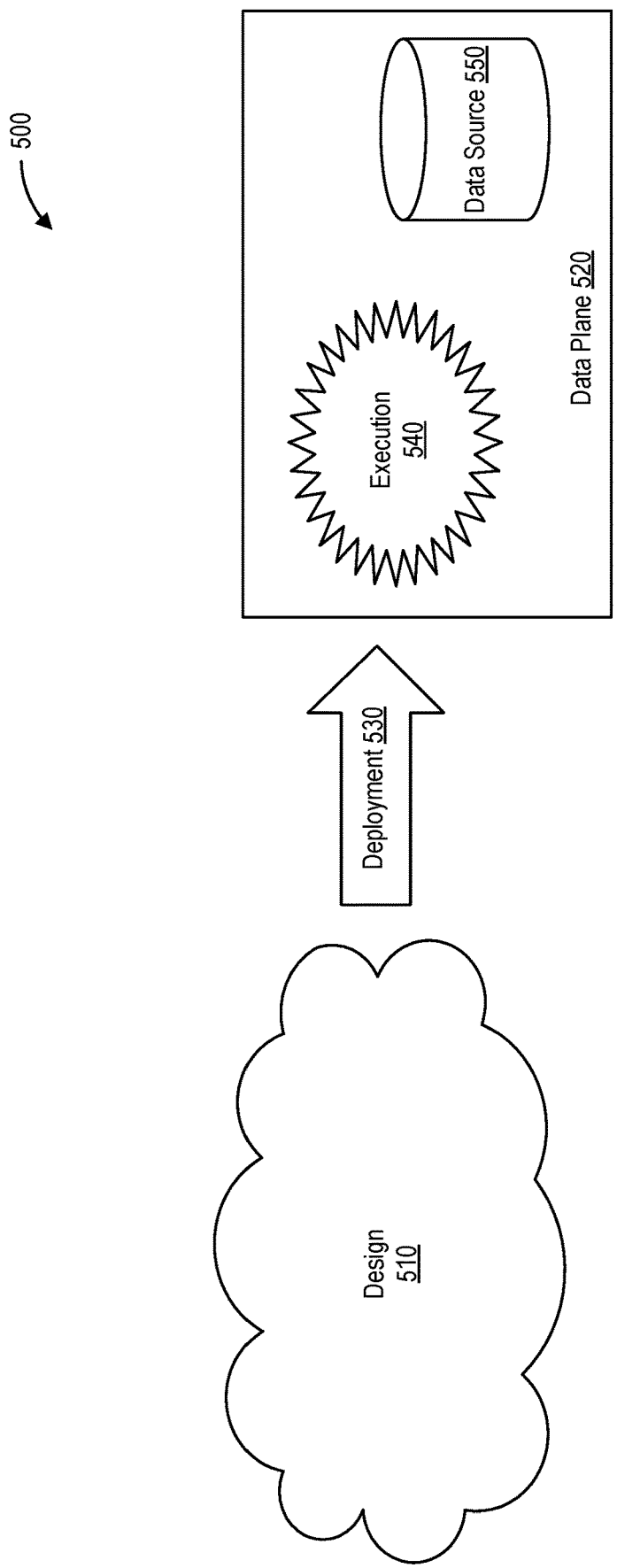
FIG. 5 is a process diagram illustrating data pipeline design and deployment, according to an embodiment.

FIG. 5 is a process diagram illustrating data pipeline design and deployment 500, according to an embodiment. In this example, a data pipeline can be designed 510 and developed in a cloud platform using a simulated dataset based on column-level statistics, as described in the example of FIG. 4 above. In particular, a generator SDK, such as generator SDK 480 of FIG. 4, can be used to generate one or more modules for processing data pipelines, such as ETL pipelines, in the data plane 520. For example, the modules could include Oracle Java Cloud Service (JCS), Oracle Database Cloud Service (DBCS), or other modules and/or instructions, and are not limited by the present disclosure.

The system can then deploy 530 the generated modules to data plane 520. In an example, deployment 530 may involve transmitting copies of the modules to data plane 520, where they can be executed 540 using the local data from data source 550. Thus, in this example, after deployment 530 of the designed data pipeline, physical execution 540 occurs in the data plane 520 inside the client organization's private network, using the authentic dataset from data source 550. Because the modules are designed 510 and tested using simulated data based on descriptive statistics from the local data, the modules can function as intended when executed 540 using the authentic local data. Accordingly, using the disclosed system and methods, the data pipeline processing modules can be successfully designed, deployed 530, and executed 540 on the authentic local data, without the local data ever being transmitted outside of data plane 520 or the client organization's private network.

Figure 6:
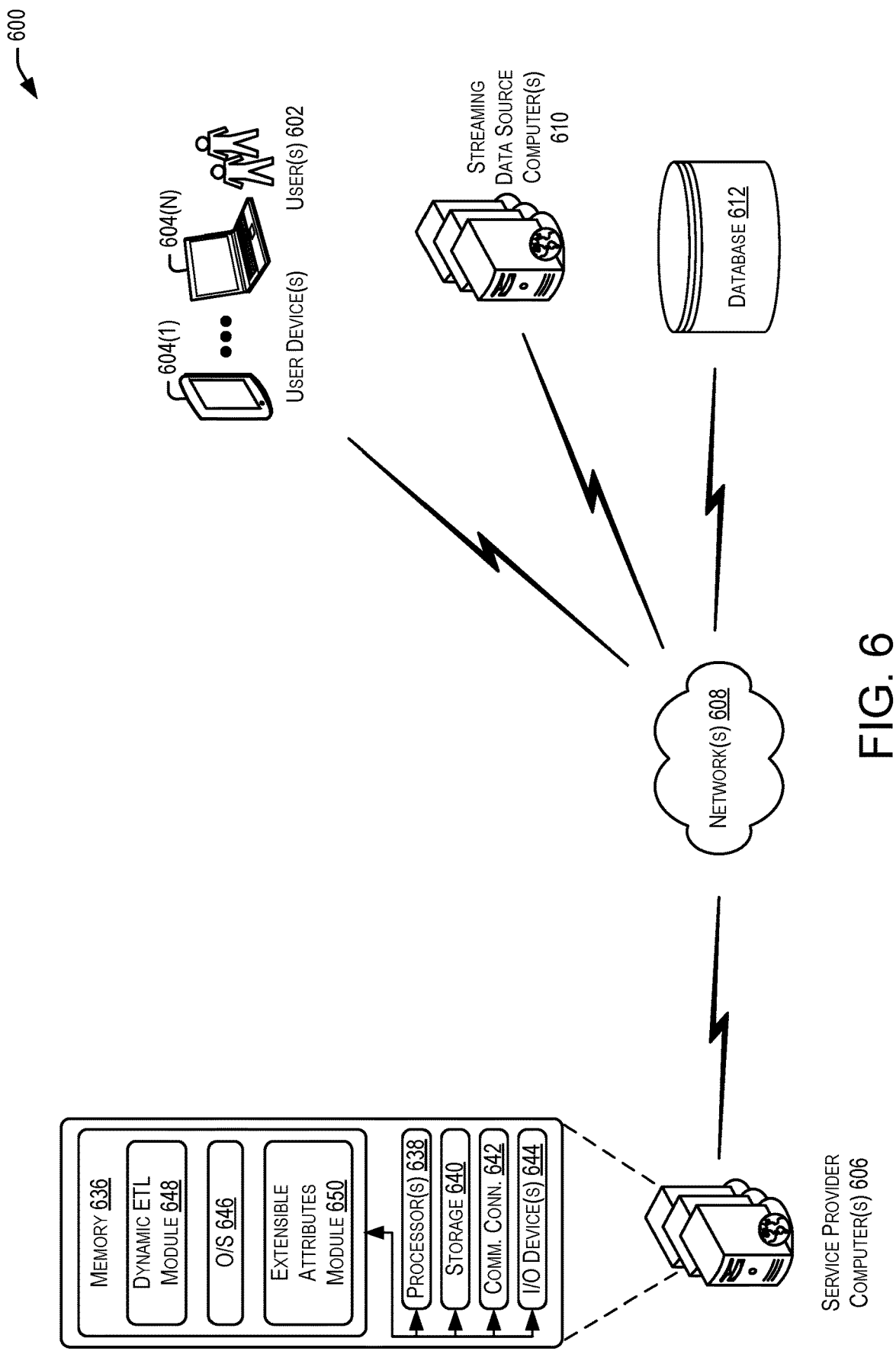
FIG. 6 depicts a simplified example system or architecture in which the disclosed techniques may be implemented.

FIG. 6 depicts a simplified example system or architecture 600 in which the disclosed techniques may be implemented. In architecture 600, one or more users 602 (e.g., account holders) may utilize user computing devices 604(1)-(N) (collectively, "user devices 604") to access one or more service provider computers 606 via one or more networks 608. In some aspects, the service provider computers 606 may also be in communication with one or more streaming data source computers 610 and/or one or more databases 612 via the networks 608. For example, the users 602 may utilize the service provider computers 606 to access or otherwise manage data of the streaming data source computers 610 and/or the databases 612 (e.g., queries may be run against either or both of 610, 612). The databases 612 may be relational databases, SQL servers, or the like and may, in some examples, manage historical data, event data, relations, archived relations, or the like on behalf of the users 602. Additionally, the databases 612 may receive or otherwise store data provided by the streaming data source computers 610. In some examples, the users 602 may utilize the user devices 604 to interact with the service provider computers 606 by providing queries (also referred to as "query statements") or other requests for data (e.g., historical event data, streaming event data, etc.). Such queries or requests may then be executed by the service provider computers 606 to process data of the databases 612 and/or incoming data from the streaming data source computers 610. Further, in some examples, the streaming data source computers 610 and/or the databases 612 may be part of an integrated, distributed environment associated with the service provider computers 606.

In some examples, the networks 608 may include any one or a combination of multiple different types of networks, such as cable networks, the Internet, wireless networks, cellular networks, intranet systems, and/or other private and/or public networks. While the illustrated example represents the users 602 accessing the service provider computers 606 over the networks 608, the described techniques may equally apply in instances where the users 602 interact with one or more service provider computers 606 via the one or more user devices 604 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The user devices 604 may be any type of computing device such as, but not limited to, a mobile phone, a smart phone, a personal digital assistant (PDA), a laptop computer, a desktop computer, a thin-client device, a tablet PC, etc. In some examples, the user devices 604 may be in communication with the service provider computers 606 via the networks 608, or via other network connections. Further, the user devices 604 may also be configured to provide one or more queries or query statements for requesting data of the databases 612 (or other data stores) to be processed.

In some aspects, the service provider computers 606 may also be any type of computing devices such as, but not limited to, mobile, desktop, thin-client, and/or cloud computing devices, such as servers. In some examples, the service provider computers 606 may be in communication with the user devices 604 via the networks 608, or via other network connections. The service provider computers 606 may include one or more servers, perhaps arranged in a cluster, as a server farm, or as individual servers not associated with one another. These servers may be configured to perform or otherwise host features described herein including, but not limited to, the management of archived relations, configurable data windows associated with archived relations, and/or accurately counting change events associated with managing archived relations described herein. Additionally, in some aspects, the service provider computers 606 may be configured as part of an integrated, distributed computing environment that includes the streaming data source computers 610 and/or the databases 612.

In one illustrative configuration, the service provider computers 606 may include at least one memory 636 and one or more processing units (or processor(s)) 638. The processor(s) 638 may be implemented as appropriate in hardware, computer-executable instructions, firmware, or combinations thereof. Computer-executable instruction or firmware implementations of the processor(s) 638 may include computer-executable or machine-executable instructions written in any suitable programming language to perform the various functions described.

The memory 636 may store program instructions that are loadable and executable on the processor(s) 638, as well as data generated during the execution of these programs. Depending on the configuration and type of service provider computers 606, the memory 636 may be volatile (such as random access memory (RAM)) and/or non-volatile (such as read-only memory (ROM), flash memory, etc.). The service provider computers 606 or servers may also include additional storage 640, which may include removable storage and/or non-removable storage. The additional storage 640 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 636 may include multiple different types of memory, such as static random access memory (SRAM), dynamic random access memory (DRAM), or ROM.

The memory 636, the additional storage 640, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 636 and the additional storage 640 are all examples of computer storage media.

The service provider computers 606 may also contain communications connection(s) 642 that allow the identity interface computers 620 to communicate with a stored database, another computing device or server, user terminals, and/or other devices on the networks 608. The service provider computers 606 may also include input/output (I/O) device(s) 644, such as a keyboard, a mouse, a pen, a voice input device, a touch input device, a display, one or more speakers, a printer, etc.

Turning to the contents of the memory 636 in more detail, the memory 636 may include an operating system 646 and one or more application programs or services for implementing the features disclosed herein including at least a dynamic ETL module 648 and an extensible attributes module 650. In some cases, the extensible attributes module 650 may be configured to implement the auto-allocation engine described above. The dynamic ETL module 648 may be configured to implement a knowledge module for generating dynamic ETL code that implements the auto-allocation engine and/or manages the attribute mapping. As used herein, modules may refer to programming modules executed by servers or clusters of servers that are part of a service. In this particular context, the modules may be executed by the servers or clusters of servers that are part of the service provider computers 606.

Figure 7:
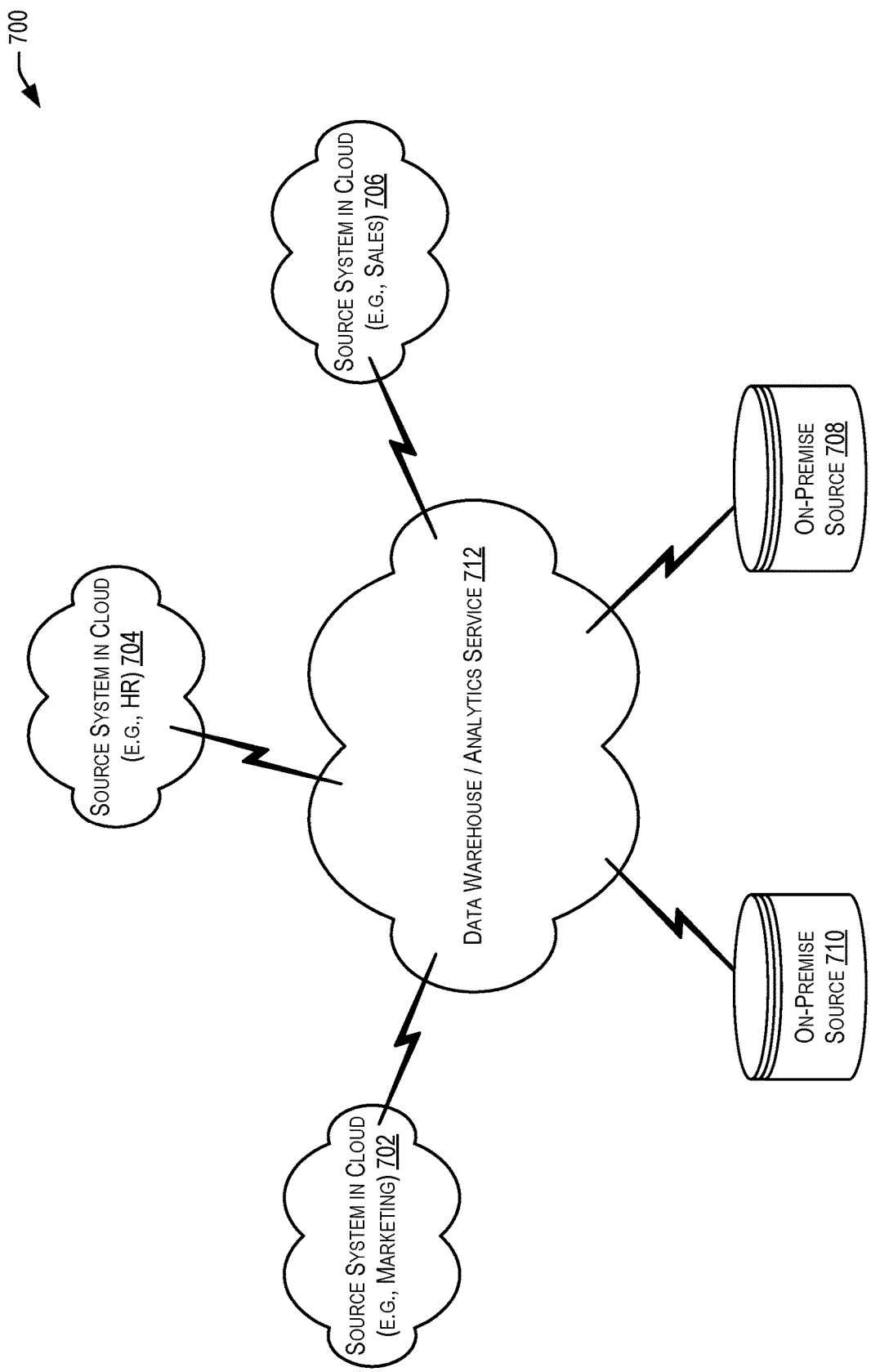
FIG. 7 depicts a simplified high level diagram of an cloud system that may incorporate an embodiment of the present disclosure.

FIG. 7 illustrates a high level architecture 700 for implementing the extensible attributes described herein. Custom fields from source systems 702, 704, 706, 708, 710 (e.g., on-premise sources and/or in the cloud sources) need to be propagated to the central cloud service that represents the Data Warehouse/Reporting system 712.

As noted, a fixed number of custom columns may be added in the data warehouse 712 during initial deployment. This imposes further challenges—e.g. support for different data types like Numeric, Character, or Date, and support for end-user specific metadata for the custom fields like the label, language, and list of supported values. Doing this requires a dynamic intelligence in the workflows since end-users (or their IT representative) do not have the ability to configure and change the data warehouse 712.

FIG. 7 depicts a simplified high level diagram of an cloud system 700 that may incorporate an embodiment of the present disclosure. In some examples, a data warehouse/ analytics service may be implemented in the cloud (e.g., as a set of networked computing devices providing one or more web services for customers). This data warehouse may be in communication with one or more other cloud services (e.g., third party services) such as, but not limited to, a cloud marketing service, a cloud human resources (HR) service, and/or a cloud sales service. Additionally, the data warehouse may also be in communication with one or more customer sources (e.g., the on-premise data sources). In some examples, each of the on-premise (customer) sources may only be capable of pulling their own (customer-specific) data. While the data warehouse may manage data for many different customers, the customer sources may only be able to access data specific to that customer.

The one or more of the components depicted in FIG. 7 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Figure 8A:
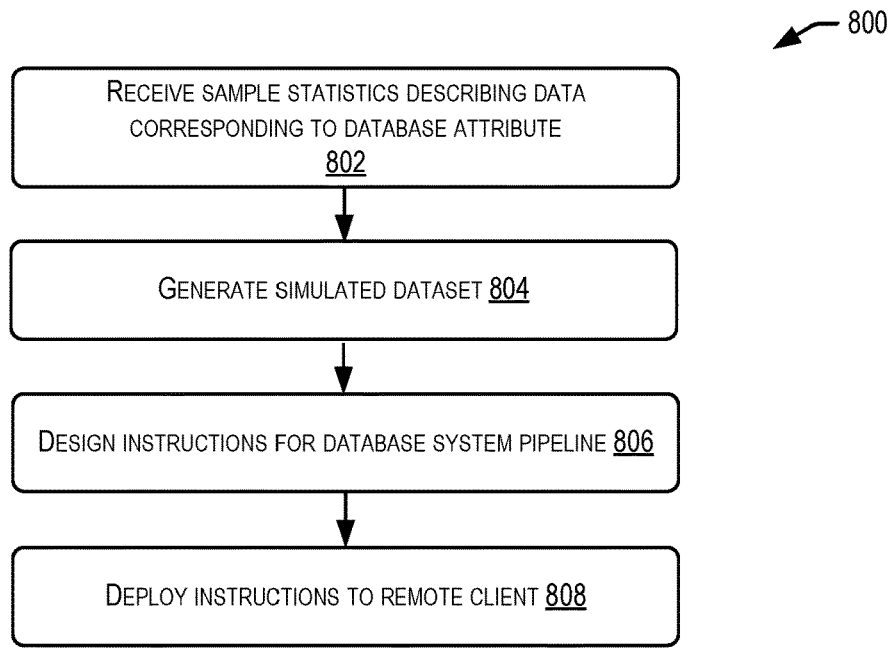
FIG. 8A is a flow diagram of a method for designing and deploying a pipeline, in accordance with embodiments of the present disclosure.

FIG. 8A is a flow diagram of a method 800 for designing and deploying a pipeline, in accordance with embodiments of the present disclosure. In an exemplary embodiment, method 800 can be implemented by a cloud-based platform or control plane, cloud-based server, data center, storage device, or any cloud-based computing or storage system, and is not limited by the present disclosure.

In operation 802, the cloud-based platform can receive sample statistics describing data corresponding to an attribute of a database table in the data plane. For example, the cloud-based platform may receive the descriptive statistics sent by the data source, data plane, and/or local computing system via the Internet, a virtual private network (VPN), a secure transmission, or any other means of communication, and is not limited by the present disclosure. In various examples, the sample statistics can include a minimum value, a maximum value, a mean, a median, a mode, a standard deviation, a statistical moment, a length, a range, a statistical frequency, a count, or a distinct count, or any other parameters of any probability distribution, and are not limited by the present disclosure.

In operation 804, the cloud-based platform can generate a simulated dataset. Generating the simulated dataset may be based on the received descriptive statistics. For example, the system may simulate a dataset using a pseudo-random number generator based on received descriptive statistics, such as mean and standard deviation values of the corresponding database attribute in the data plane. Generating the simulated dataset will be described further in the example of FIG. 8B below.

In operation 806, the cloud-based platform can design instructions for a database system pipeline. In some embodiments, a user can design the instructions via the cloud-based platform and/or transmit the instructions to the cloud-based platform via a user interface. In some embodiments, the cloud platform may include a generator software development kit (SDK), which can be used (e.g., by a user) to design, develop, and test data processing pipelines that manage the data in the data plane, and/or instructions for implementing such pipelines. For example, the data pipelines may include Extract-Transform-Load (ETL) pipelines, Extract-Load-Transform (ELT) pipelines, or other data processing pipelines, and are not limited by the present disclosure. In particular, the generator SDK may be used to generate instructions specifically for a client's database, such as the data source from which the descriptive statistics are received.

In operation 808, the cloud-based platform can deploy the instructions to a remote client. For example, the remote client could be located at a customer's on-premises data center and/or in the data plane, such that it has access to the actual database table, or may be located elsewhere, and is not limited by the present disclosure. Because the instructions have been designed and/or tested at the cloud-based platform using the simulated dataset, they work correctly on the actual data.

Figure 8B:
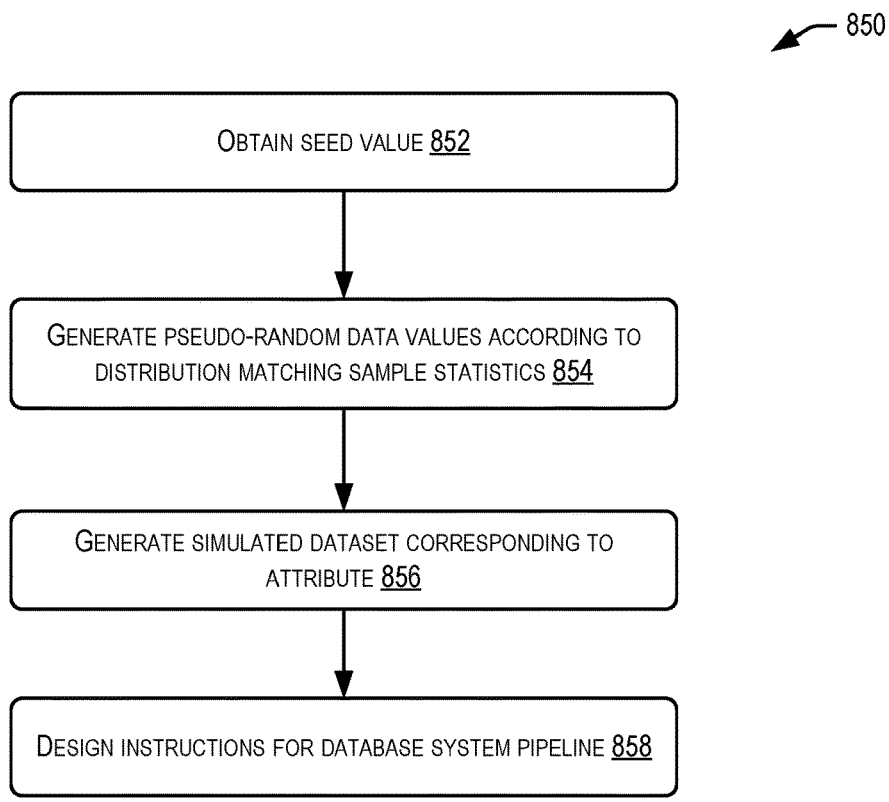
FIG. 8B is a flow diagram of a method for generating a simulated dataset, in accordance with embodiments of the present disclosure.

FIG. 8B is a flow diagram of a method 850 for generating a simulated dataset, in accordance with embodiments of the present disclosure. In an exemplary embodiment, method 850 can be implemented by a cloud-based platform or control plane, cloud-based server, data center, storage device, or any cloud-based computing or storage system.

In operation 852, the cloud-based platform can obtain a seed value for a pseudo-random generator. For example, the seed value may be a predetermined value or be an element of a predetermined sequence of values, or may be provided by a user input, or obtained in any other way. The system may seed a pseudo-random generator with the obtained seed value. In some embodiments, using a definite seed value for the pseudo-random number generator may result in a deterministic, repeatable sequence of pseudo-random values. It is known that pseudo-random number generators generally use deterministic sequences or algorithms to determine pseudo-random numbers, and therefore an entire sequence of pseudo-random numbers may be determined by the seed value used.

For example, the system may simulate a dataset using a pseudo-random number generator based on mean and standard deviation values of a column in the database. The pseudo-random number generator may generate pseudo-random numbers according to a statistical distribution, including but not limited to standard statistical distributions such as a normal distribution, a uniform distribution, a Cauchy distribution, a Poisson distribution, a logistic distribution, a binomial distribution, or any other distribution. The pseudo-random number generator may also use any other distribution, and is not limited by the present disclosure. In some embodiments, the system may be able to reproduce the simulated dataset deterministically in multiple locations and/or on multiple occasions, without needing to store or transmit the detailed simulated dataset.

In operation 854, the cloud-based platform can generate pseudo-random data values according to a distribution matching the sample statistics. In one example, a pseudo-random number generator can generate the pseudo-random data values according to standard statistical distributions such as a normal distribution, a uniform distribution, a Cauchy distribution, a Poisson distribution, a logistic distribution, or a binomial distribution. The pseudo-random number generator may also use any other distribution, and is not limited by the present disclosure. The term "random" may also be used herein to refer to data generated using a pseudo-random number generator.

In operation 856, the cloud-based platform can generate a simulated dataset corresponding to the attribute. When generating the simulated dataset, the pseudo-random number generator may use the received descriptive statistics values as parameters of the distribution. In one example, the system may use normally distributed pseudo-random numbers having a population mean and population standard deviation based on the received descriptive statistics. In another example, the system may generate a simulated dataset based on a probability distribution for random strings with a mode letter parameter, median string length parameter, and/or a mean word length parameter. In various embodiments, the system may use other probability distributions, and/or other parameters, to generate the simulated data. For example, the system may use a minimum value, a maximum value, a mean, a median, a mode, a standard deviation, a statistical moment, a length, a range, a statistical frequency, a count, or a distinct count, or any other parameters with a probability distribution when generating the simulated data, and is not limited by the present disclosure.

In some embodiments, the system may generate simulated data of any data type, including but not limited to integer, numeric, floating point, fixed-precision numeric, complex numbers, strings, currency, etc. In some embodiments, a data type of the simulated data may match the data type of the actual data in the corresponding column in the local table. For example, if the actual column in the original database table in the data plane has an integer data type, the simulated dataset of the corresponding column in the cloud platform can also have an integer data type.

In an example, the cloud-based platform may use a particular probability distribution to generate the simulated dataset, and may therefore use parameters typically associated with that particular probability distribution, irrespective of the actual distribution of the actual column data of the table in the data plane. In such an example, the generated simulated dataset in the cloud platform may not necessarily follow an identical distribution to the actual data in the data plane, yet still may be useful for the purpose of designing, developing, and/or testing data processing pipelines.

In another example, additional statistics may be chosen to constrain the simulated data to be more similar to the actual data. For example, if a range statistic were specified, the simulated data might be constrained to fall within the specified range, as well. In this way, the simulated data could be constrained to be positive, or to have a minimum value greater than zero or some other value, etc. Moreover, in some embodiments, a particular statistical distribution may also be specified, and the simulated data may be generated according to the specified distribution, and is not limited by the present disclosure.

As described above, the simulated data may be generated using a pseudo-random number generator, according to a statistical distribution, and with the received descriptive statistics values as parameters of the distribution. Note also that the pseudo-random number generator may be seeded with a seed value. In some embodiments, using a definite seed value for the pseudo-random number generator may result in a deterministic, repeatable sequence of pseudo-random values for the simulated data. It is known that pseudo-random number generators generally use deterministic sequences or algorithms to determine pseudo-random numbers, and therefore an entire sequence of pseudo-random numbers may be determined by the seed value used. Accordingly, in some embodiments, the system may be able to reproduce the simulated dataset deterministically in multiple locations and/or on multiple occasions, without needing to store or transmit the detailed simulated dataset.

In operation 858, instructions for a database system pipeline are designed. In some embodiments, the cloud-based platform can design the instructions. In some embodiments, a user can design the instructions via the cloud-based platform and/or transmit the instructions to the cloud-based platform via a user interface. In some embodiments, the cloud platform may include a generator software development kit (SDK), which can be used (e.g., by a user) to design, develop, and test data processing pipelines that manage the data in the data plane, and/or instructions for implementing such pipelines. For example, the data pipelines may include Extract-Transform-Load (ETL) pipelines, Extract-Load-Transform (ELT) pipelines, or other data processing pipelines, and are not limited by the present disclosure. In particular, the generator SDK may be used to generate instructions specifically for a client's database, such as the data source from which the descriptive statistics are received. In some embodiments, a user can design the instructions via the cloud-based platform and/or transmit the instructions to the cloud-based platform via a user interface. In some embodiments, the cloud platform may include a generator software development kit (SDK), which can be used (e.g., by a user) to design, develop, and test data processing pipelines that manage the data in the data plane, and/or instructions for implementing such pipelines. For example, the data pipelines may include Extract-Transform-Load (ETL) pipelines, Extract-Load-Transform (ELT) pipelines, or other data processing pipelines, and are not limited by the present disclosure. In particular, the generator SDK may be used to generate instructions specifically for a client's database, such as the data source from which the descriptive statistics are received.

Figure 9:
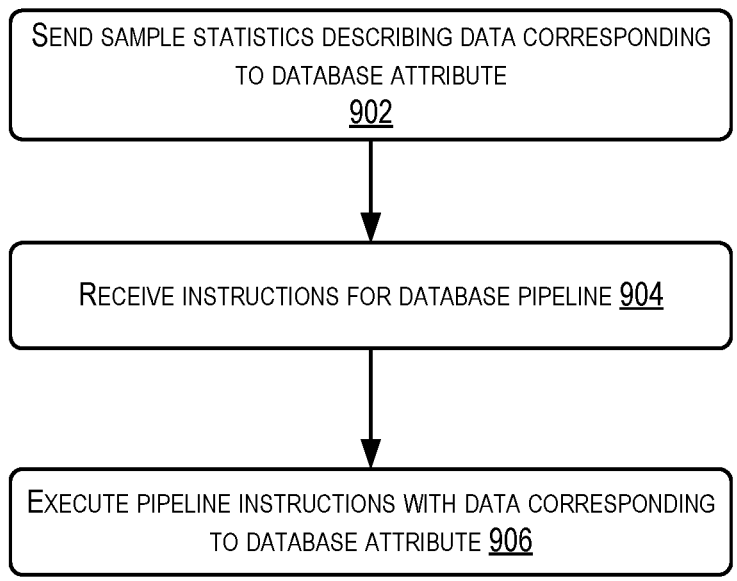
FIG. 9 is a flow diagram of a method for interacting with a cloud platform, in accordance with embodiments of the present disclosure.

FIG. 9 is a flow diagram of a method 900 for interacting with a cloud platform, in accordance with embodiments of the present disclosure. In an exemplary embodiment, method 900 can be implemented by an on-premises computing or storage system, a client computer, one or more computing nodes of an intranet or local network, and/or a computing system, and is not limited by the present disclosure. For example, the on-premises computing system may be located at a customer's on-premises data center and/or in the data plane.

In operation 902, the on-premises computing system can send sample statistics describing data corresponding to a database attribute. For example, the on-premises computing system may send the descriptive statistics to the cloud platform via the Internet, a virtual private network (VPN), a secure transmission, or any other means of communication, and is not limited by the present disclosure. In various examples, the sample statistics can include a minimum value, a maximum value, a mean, a median, a mode, a standard deviation, a statistical moment, a length, a range, a statistical frequency, a count, or a distinct count, or any other parameters of any probability distribution, and are not limited by the present disclosure.

In operation 904, the on-premises computing system can receive instructions for a database pipeline. For example, the on-premises computing system may receive the instructions from the cloud platform via the Internet, a virtual private network (VPN), a secure transmission, or any other means of communication, and is not limited by the present disclosure.

In operation 906, the on-premises computing system can execute pipeline instructions with the actual data corresponding to the database attribute in the database table. The database table may reside in the data plane. Because the instructions have been designed and/or tested at the cloud-based platform using the simulated dataset, they can work correctly on the actual data.

Figure 10:
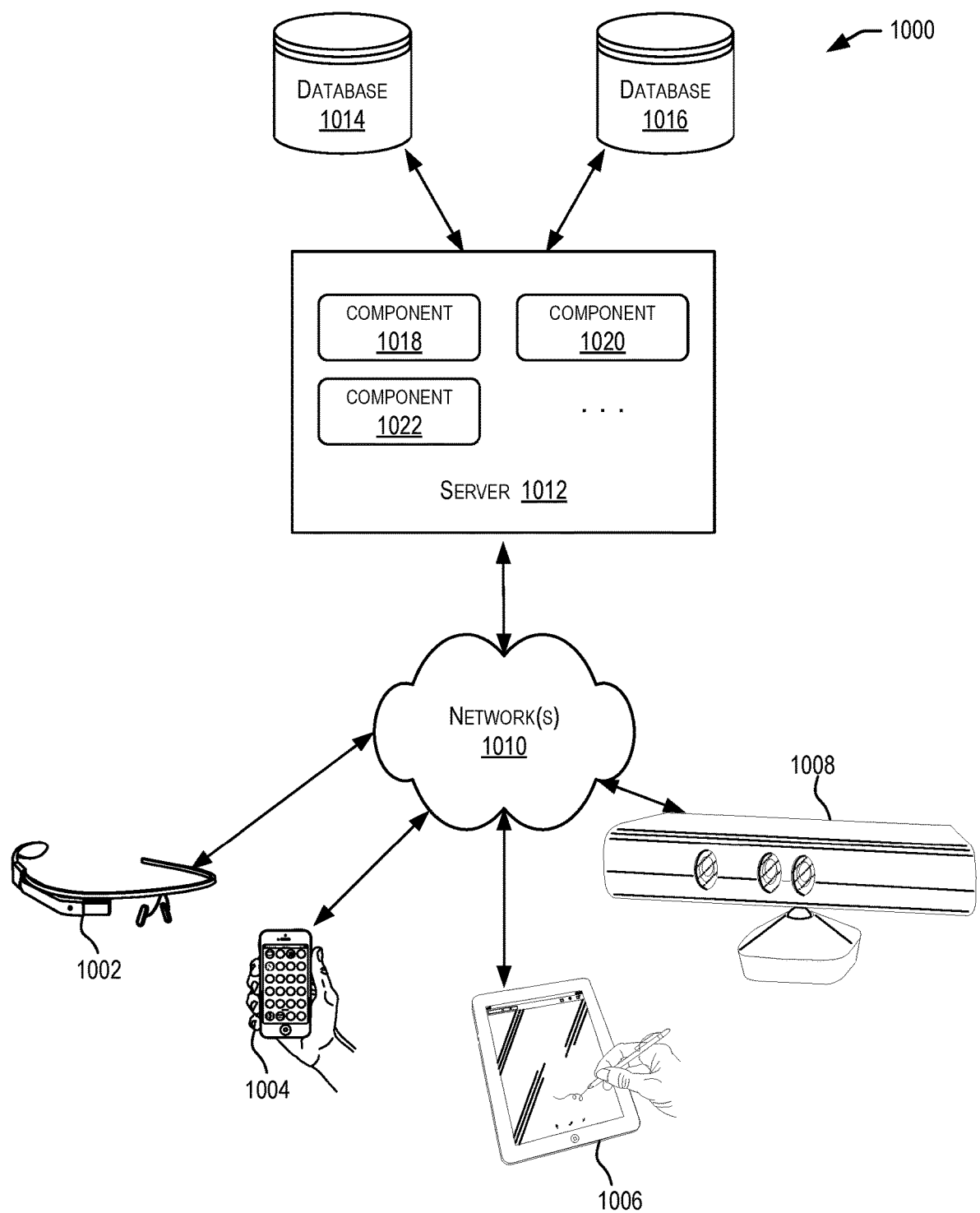
FIG. 10 depicts a simplified diagram of a distributed system for implementing one of the embodiments.

FIG. 10 depicts a simplified diagram of a distributed system 1000 for implementing one of the embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in the figure, the software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1010.

Although exemplary distributed system 1000 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 602.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 can include one or more virtual machines running virtual operating systems, or other computing architectures involving virtualization. One or more flexible pools of logical storage devices can be virtualized to maintain virtual storage devices for the server. Virtual networks can be controlled by server 1012 using software defined networking. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
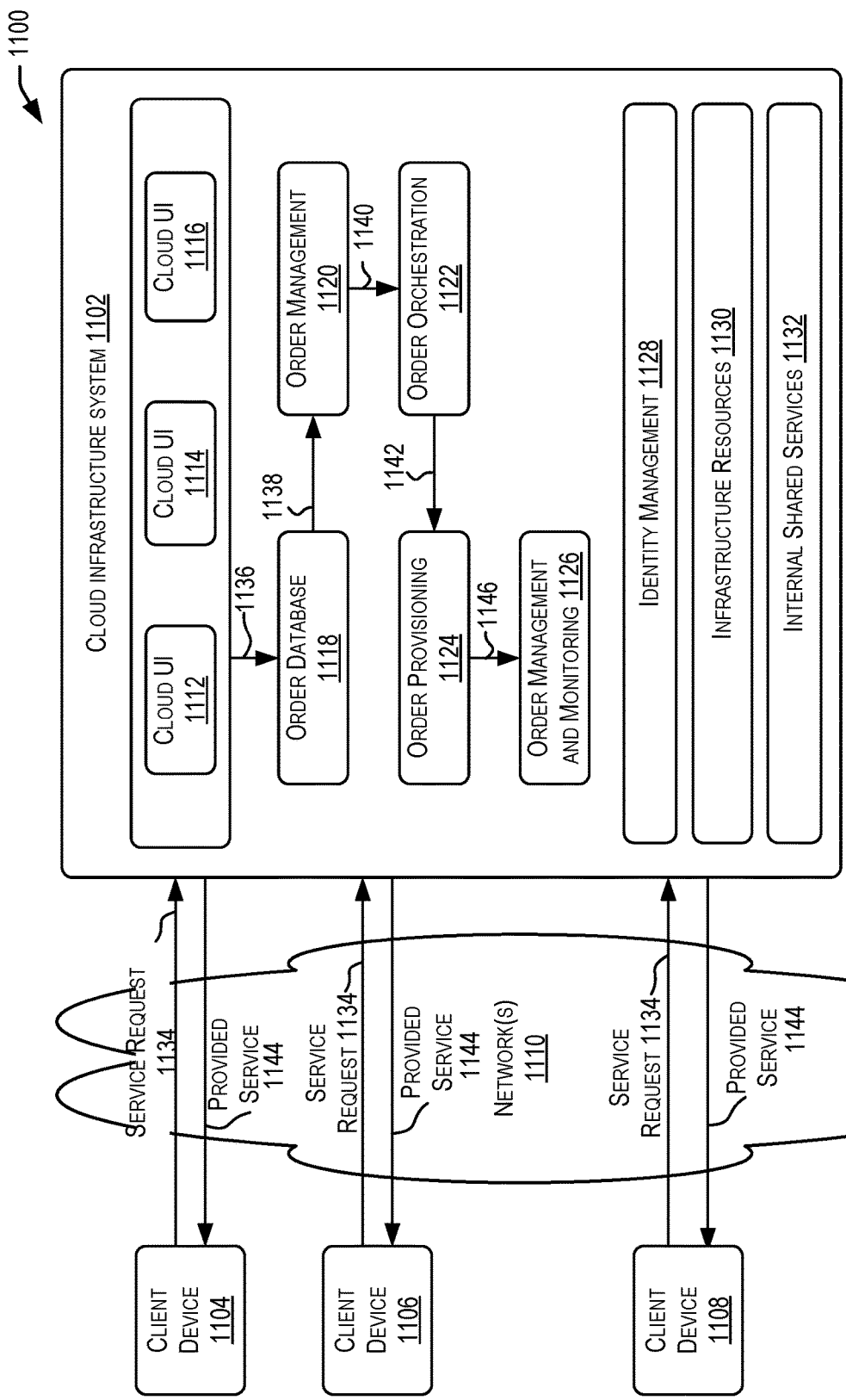
FIG. 11 is a simplified block diagram of one or more components of a system environment by which services provided by one or more components of an embodiment system may be offered as cloud services, in accordance with an embodiment of the present disclosure.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the disclosure. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1002, 1004, 1006, and 1008.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 1010.

Cloud infrastructure system 1102 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

'Big data' can be hosted and/or manipulated by the infrastructure system on many levels and at different scales. Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
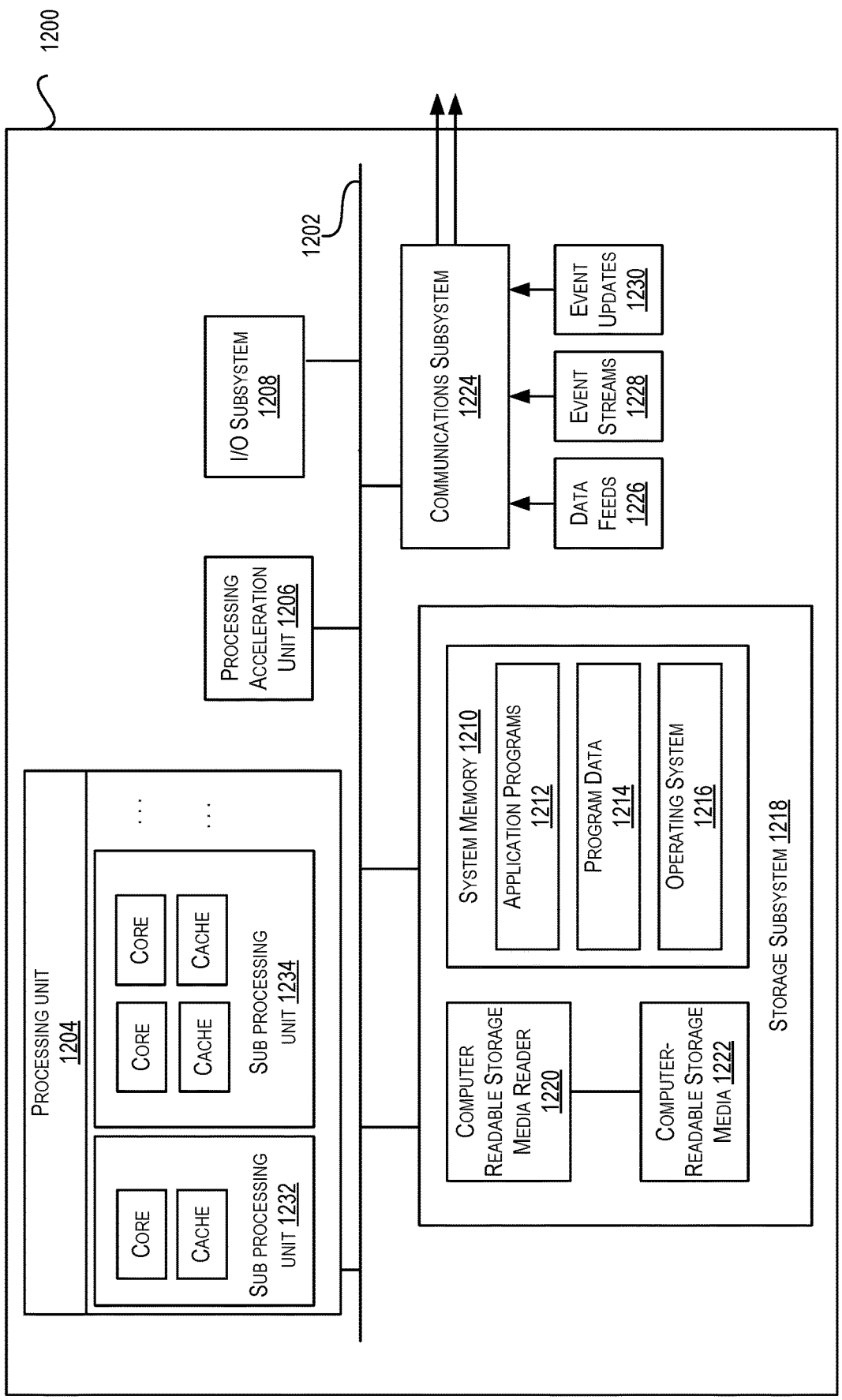
FIG. 12 illustrates an exemplary computer system, in which various embodiments of the present disclosure may be implemented.

FIG. 12 illustrates an exemplary computer system 1200, in which various embodiments of the present disclosure may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 8 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 602.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Some companies have various cloud services for Sales, Service, Human Capital Management and Talent, and on-premise enterprise systems like Fusion, Enterprise Business Systems (EBS), PeopleSoft or JDE. Some offer Enterprise Business Intelligence Application services in the cloud that deploy a data warehouse and reporting system.

Figure 13:
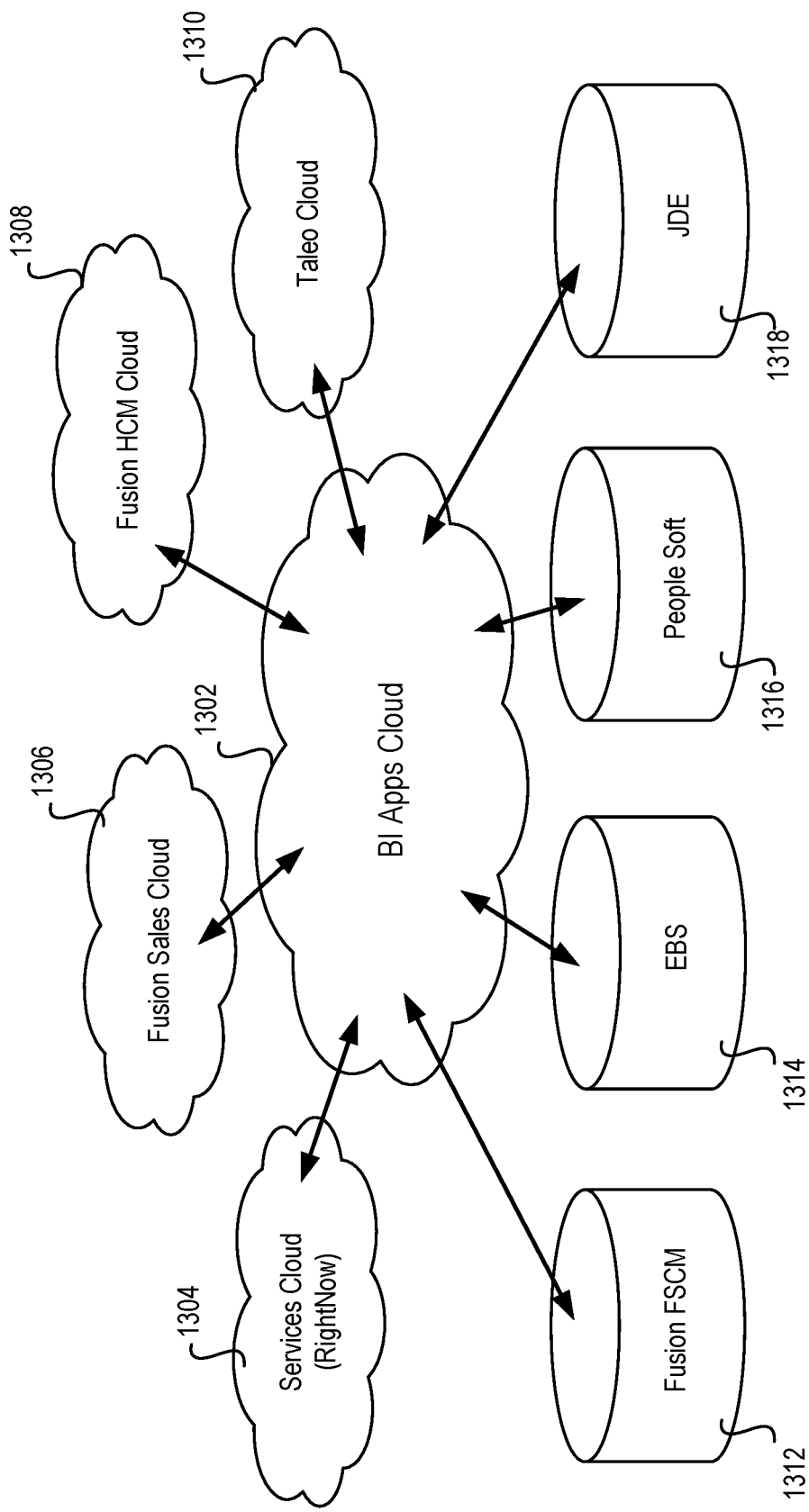
FIG. 13 depicts some specific cloud services and cloud targets that can be utilized to implement the features described herein.

FIG. 13 depicts some specific cloud services and cloud targets that can be utilized to implement the features described herein. For example, a Business Intelligence Applications (BI Apps) Cloud 1302 can be configured to provide access of one or more targets (e.g., storage services, storage locations, etc.) to one or more services. Example services include a Web Services cloud service 1304 (e.g., RightNow Adapter or other cloud service), a sales cloud service 1306 (e.g., Fusion Sales Cloud), a Human Capital Management cloud service 1308 (e.g., Fusion HCM Cloud), and/or other cloud services 1310 (e.g., Taleo Cloud). Additionally, example targets include a Supply Chain Management (SCM) target 1312 (e.g., Fusion SCM), a block storage target 1314 (e.g., elastic block storage targets), an HCM target 1316 (e.g., PeopleSoft), and/or other enterprise targets 1318 (e.g., JD Edwards Enterprise One or the like).

Figure 14:
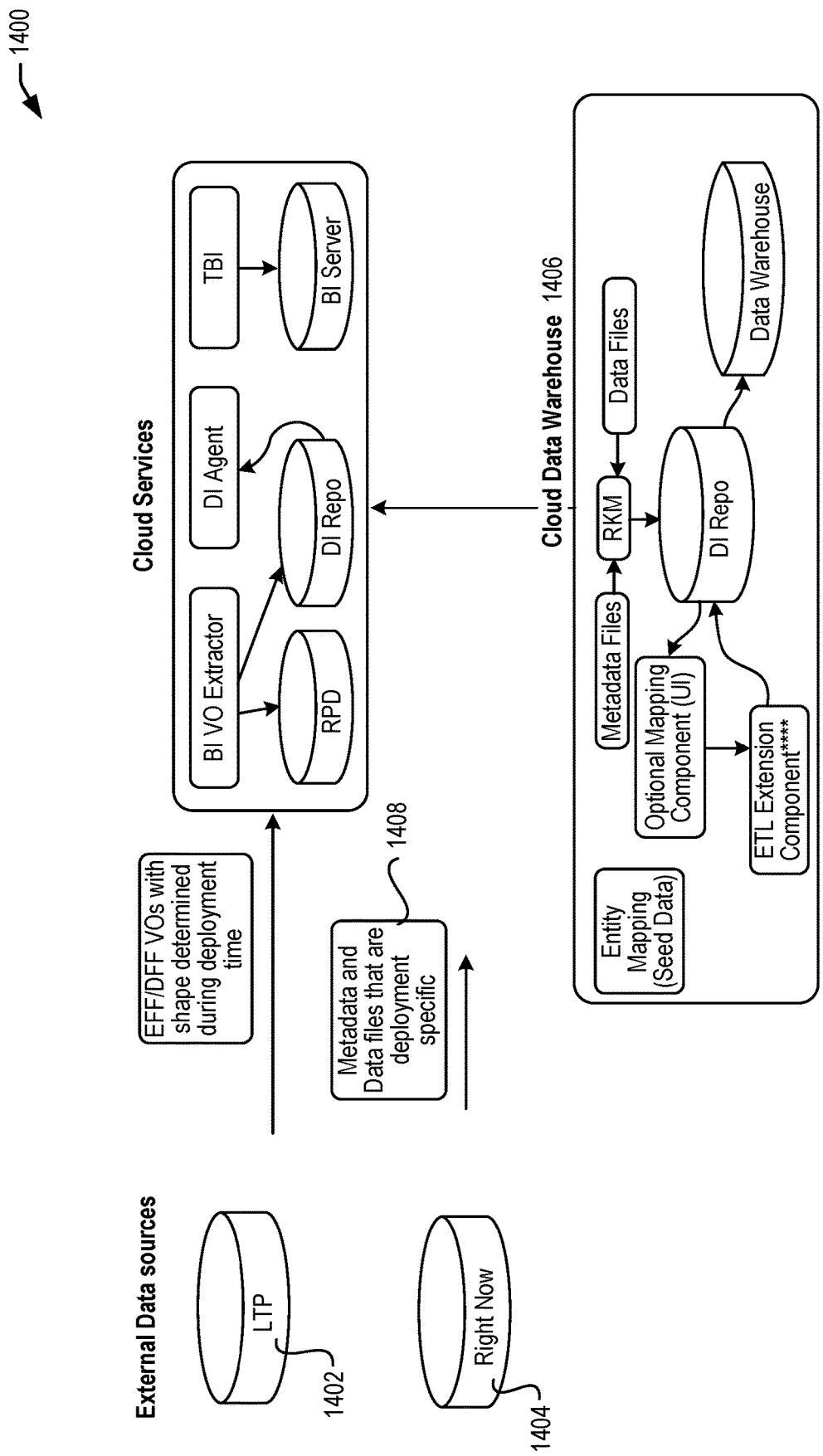
FIG. 14 illustrates architecture that depicts some additional cloud services that can be utilized to implement some of the features described herein.

FIG. 14 illustrates architecture 1400 that depicts some additional cloud services that can be utilized to implement some of the features described herein. For example, external data sources such as Online Transaction Processing (LTP) software 1402 and/or RightNow 1404 can be implemented in the cloud. Additionally, in some examples, the Cloud Data Warehouse 1406 may also be implemented in the cloud. In some examples, there is metadata 1408 and other data that can be extracted over the cloud.

LTP services are premier cloud based source transactional systems for Sales, Marketing, Human Capital Management, etc. RightNow is a service management cloud service. In some examples, the ETL technology is called Data Integrator (DI) which has a metadata repository (e.g., DI Repo). In some examples, TBI (Transactional Business Intelligence) is a transactional reporting service which uses a BI Server (e.g., the Oracle Business Intelligence Suite Enterprise Edition, or the like).

Metadata component for holding the Business Intelligence logic including ETL logic is called RPD. In some instances, the metadata component for holding reports and layouts is called Webcat. In some cases, the Data Warehouse 1406 has a variety of components. Entity seed data represents metadata that is persisted out-of-the box as part of the deployment with the source to target entity level mappings. RKM stands for Reverse Engineering Knowledge Module—this is part of the DI technology to write code for dynamic transformations of data and metadata. Additionally, output of the extensibility logic is a layer called Source Dependent Extracts (SDE). This represents the ETL code that has been extended to load the custom columns into the data warehouse. Further, the DI repo is the metadata repository for an ETL tool and it has all the logic needed for data movement and transformation for the custom columns to be loaded into the warehouse.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A method, comprising:
   receiving, by a server and from a remote client, sample statistics describing data, the data corresponding to an attribute of a database relation;
   generating, on the server and based at least in part on the received sample statistics, a simulated dataset corresponding to the attribute of the database relation;
   building a simulated database relation based at least in part on the simulated dataset;
   generating, based at least in part on the simulated dataset, pipeline instructions associated with a database pipeline; and
   deploying the generated pipeline instructions to the remote client.

2. The method of claim 1, wherein the sample statistics characterize a distribution of the data corresponding to the attribute.

3. The method of claim 1, wherein the remote client is configured to:
   receive the pipeline instructions; and
   execute the pipeline instructions using the data corresponding to the attribute of the database relation.

4. The method of claim 1, wherein generating the simulated dataset further comprises generating pseudo-random data values according to a distribution, the distribution having population statistics matching the received sample statistics.

5. The method of claim 4, further comprising obtaining a seed value, and wherein generating the pseudo-random data values further comprises seeding a pseudo-random generator with at least the obtained seed value.

6. The method of claim 1, wherein the remote client is configured to determine the sample statistics describing the data.

7. The method of claim 1, further comprising:
   receiving, by the server and from the remote client, updated sample statistics describing updated data, the updated data corresponding to the attribute of the database relation; and
   updating, on the server and based at least in part on the updated sample statistics, the simulated dataset.

8. The method of claim 1, wherein the attribute comprises a column of an on-premises database table, and wherein the data corresponding to the attribute is stored within the column.

9. The method of claim 1, wherein the received sample statistics describing the data comprise information other than the data, and wherein a size of the received sample statistics does not depend on a size of the data.

10. A system, comprising:
    one or more processors; and
    a memory configured to store computer-executable instructions that, when executed by the one or more processors, cause the one or more processors to:
      receive, from a remote client, sample statistics describing data, the data corresponding to an attribute of a database relation;
      generate, based at least in part on the received sample statistics, a simulated dataset corresponding to the attribute of the database relation;
      build a simulated database relation based at least in part on the simulated dataset;
      generate, based at least in part on the simulated dataset, pipeline instructions associated with a database pipeline; and
      deploy the generated pipeline instructions to the remote client.

11. The system of claim 10, wherein the sample statistics characterize a distribution of the data corresponding to the attribute.

12. The system of claim 10, wherein generating the simulated dataset further comprises generating pseudo-random data values according to a distribution, the distribution having population statistics matching the received sample statistics, and wherein the processors are further caused to obtain a seed value, and wherein generating the pseudo-random data values further comprises seeding a pseudo-random generator with at least the obtained seed value.

13. A non-transitory computer-readable medium storing computer-executable instructions that, when executed by a processor, cause the processor to perform operations comprising:
    receiving, from a remote client, sample statistics describing data, the data corresponding to an attribute of a database relation;
    generating, based at least in part on the received sample statistics, a simulated dataset corresponding to the attribute of the database relation;
    building a simulated database relation based at least in part on the simulated dataset;
    generating, based at least in part on the simulated dataset, pipeline instructions associated with a database pipeline: and
    deploying the generated pipeline instructions to the remote client.

14. The non-transitory computer-readable medium of claim 13, wherein the operations further comprise:
    receiving, from the remote client, updated sample statistics describing updated data, the updated data corresponding to the attribute of the database relation; and
    updating, based at least in part on the updated sample statistics, the simulated dataset.

15. The non-transitory computer-readable medium of claim 13, wherein the attribute comprises a column of an on-premises database table, and wherein the data corresponding to the attribute is stored within the column.

16. The non-transitory computer-readable medium of claim 13, wherein the received sample statistics describing the data comprise information other than the data, and wherein a size of the received sample statistics does not depend on a size of the data.

\* \* \* \* \*